United States Patent
Care et al.

(10) Patent No.: US 8,662,756 B2
(45) Date of Patent: Mar. 4, 2014

(54) BEARING ASSEMBLY

(75) Inventors: Ian C. D. Care, Derby (GB); Seamus Garvey, Nottingham (GB); Shakir Jiffri, Kandy (LK)

(73) Assignee: Rolls-Royce PLC, London (GB)

( * ) Notice: Subject to any disclaimer, the term of this patent is extended or adjusted under 35 U.S.C. 154(b) by 372 days.

(21) Appl. No.: 12/967,334

(22) Filed: Dec. 14, 2010

(65) Prior Publication Data
US 2011/0150378 A1 Jun. 23, 2011

(30) Foreign Application Priority Data
Dec. 21, 2009 (GB) .................................. 0922189.6

(51) Int. Cl.
*F16C 27/00* (2006.01)
*F16C 27/04* (2006.01)

(52) U.S. Cl.
USPC .......................................... 384/535; 384/581

(58) Field of Classification Search
USPC .............................. 384/99, 535, 581; 415/229
See application file for complete search history.

(56) References Cited

U.S. PATENT DOCUMENTS

| | | | |
|---|---|---|---|
| 5,030,016 A | 7/1991 | Schoeffter | |
| 5,067,827 A | 11/1991 | Bokel | |
| 6,116,389 A * | 9/2000 | Allaei | 188/378 |
| 7,731,426 B2 * | 6/2010 | Meacham et al. | 384/535 |
| 7,857,519 B2 * | 12/2010 | Kostka et al. | 384/535 |
| 8,136,999 B2 * | 3/2012 | Mons et al. | 384/581 |
| 8,322,038 B1 * | 12/2012 | Heidari et al. | 29/898.062 |
| 2008/0181763 A1 | 7/2008 | Webster et al. | |
| 2009/0185768 A1 | 7/2009 | Mons et al. | |

FOREIGN PATENT DOCUMENTS

| | | |
|---|---|---|
| JP | A-4-165118 | 6/1992 |
| JP | A-6-200933 | 7/1994 |
| WO | WO 2008/106952 A1 | 9/2008 |

OTHER PUBLICATIONS

European Search Report for corresponding European Patent Application No. 10194831, dated on Apr. 5, 2011.

* cited by examiner

*Primary Examiner* — Marcus Charles
*Assistant Examiner* — Adam D Rogers
(74) *Attorney, Agent, or Firm* — Oliff PLC

(57) ABSTRACT

The present invention relates to a bearing assembly (1) for a rotatable shaft (2). The bearing assembly comprises a bearing housing (10); a bearing (20) located within the bearing housing (10) and arranged in use to receive a rotatable shaft (2); and a damper (14) that couples the bearing (20) to the bearing housing (10) for damping vibrations of the rotatable shaft (2). The damper (14) comprises a shape memory alloy (40). This arrangement allows the bearing assembly to damp vibrations of the rotatable shaft.

10 Claims, 11 Drawing Sheets

BEARING ASSEMBLY

BACKGROUND

The present invention relates to a bearing assembly, in particular, a bearing assembly comprising a damper.

In gas turbine engines it is necessary to control the vibrations of the rotor in order to reduce the vibrations transmitted to the housing. This is especially important in the case of gas turbine engines for jet engines where it is necessary to reduce the vibrations transmitted to the aircraft structure.

With reference to FIG. 1, in one previously considered arrangement 100 the vibrations of the rotor shaft 108 are controlled by providing a squeeze film damper (SFD) 106 in between the bearing 102 and the bearing housing 104. The squeeze film is a small oil-filled clearance between the bearing 102 and the bearing housing. The oil film damps the radial motion of the rotating assembly and the dynamic loads transmitted to the bearing housing, thereby reducing the vibration level of the engine. Squeeze film dampers are very effective in reducing the moderate vibration that is still present after the rotor has been balanced.

SUMMARY

However, squeeze film dampers are passive because the damping force that they exert remains constant. This means that they are designed as a compromise for a range of conditions. The performance of squeeze film dampers can also be affected by the temperature of the oil, the pressure of the oil, the age and condition of the oil, and the thermal expansion of the bearing and bearing housing. All of these parameters vary during operation of the gas turbine engine which result in squeeze film dampers not controlling the vibration of the rotor sufficiently under all conditions.

According to one aspect of the present invention there is provided a bearing assembly for a rotatable shaft, comprising: a bearing housing; a bearing located within the bearing housing and arranged in use to receive a rotatable shaft; and a damper that couples the bearing to the bearing housing for damping vibrations of the rotatable shaft; wherein the damper comprises a shape memory alloy (SMA).

Preferably the damper comprises an elongate member having a portion of shape memory alloy attached thereto. In one embodiment, the shape memory alloy is attached to the elongate member at first and second opposing ends.

Preferably the bearing assembly comprises a mounting portion that couples the damper to the bearing housing.

The bearing may be a ball bearing or a roller bearing or a needle bearing.

In a preferred embodiment there are a plurality of dampers that each extend at least partially in the axial direction of the rotatable shaft which the bearing is arranged to receive. Each of the dampers may have a generally square cross section and the sides of the dampers may be parallel to one another. The plurality of dampers may be circumferentially arranged around the axis of the rotatable shaft which the bearing is arranged to receive.

There may be provided temperature control means for controlling the temperature of the shape memory alloy of the or each damper. The temperature control means may be arranged to maintain the temperature of the shape memory alloy at just above its transition temperature such that the shape memory alloy behaves as a superelastic material.

According to a further aspect of the present invention there is provided a method of controlling the stiffness of a damper of a bearing assembly, the bearing assembly comprising: a bearing housing; a bearing located within the bearing housing and arranged in use to receive a rotatable shaft; and a damper that couples the bearing to the bearing housing for damping vibrations of the rotatable shaft; wherein the damper comprises a shape memory alloy; and wherein the method comprises controlling the temperature of the shape memory alloy. In a preferred embodiment the temperature of the shape memory alloy is maintained at just above its transition temperature such the shape memory alloy behaves as a superelastic material.

According to another aspect of the present invention there is provided a gas turbine engine for a jet-engine comprising a bearing assembly according to any statement herein.

The invention may comprise any combination of the features and/or limitations referred to herein, except combinations of such features as are mutually exclusive.

BRIEF DESCRIPTION OF THE DRAWINGS

Embodiments of the present invention will now be described, by way of example only, with reference to the accompanying drawings, in which.

DETAILED DESCRIPTION OF THE EMBODIMENTS

Figure 1:
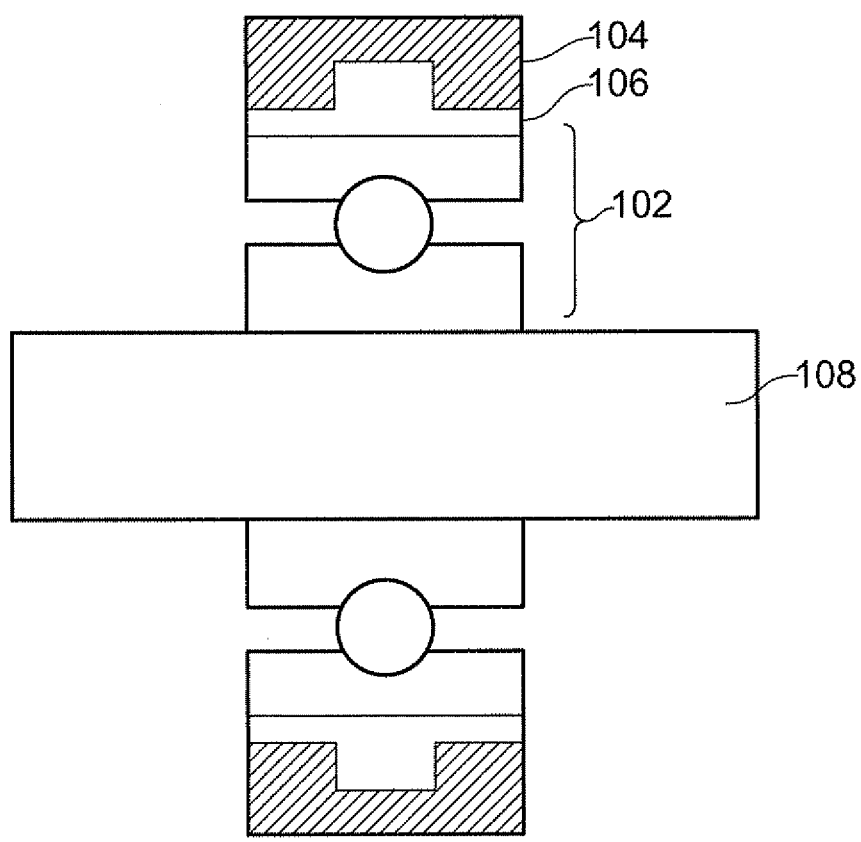
FIG. 1 schematically shows a previously considered bearing and damper arrangement.
Figure 2:
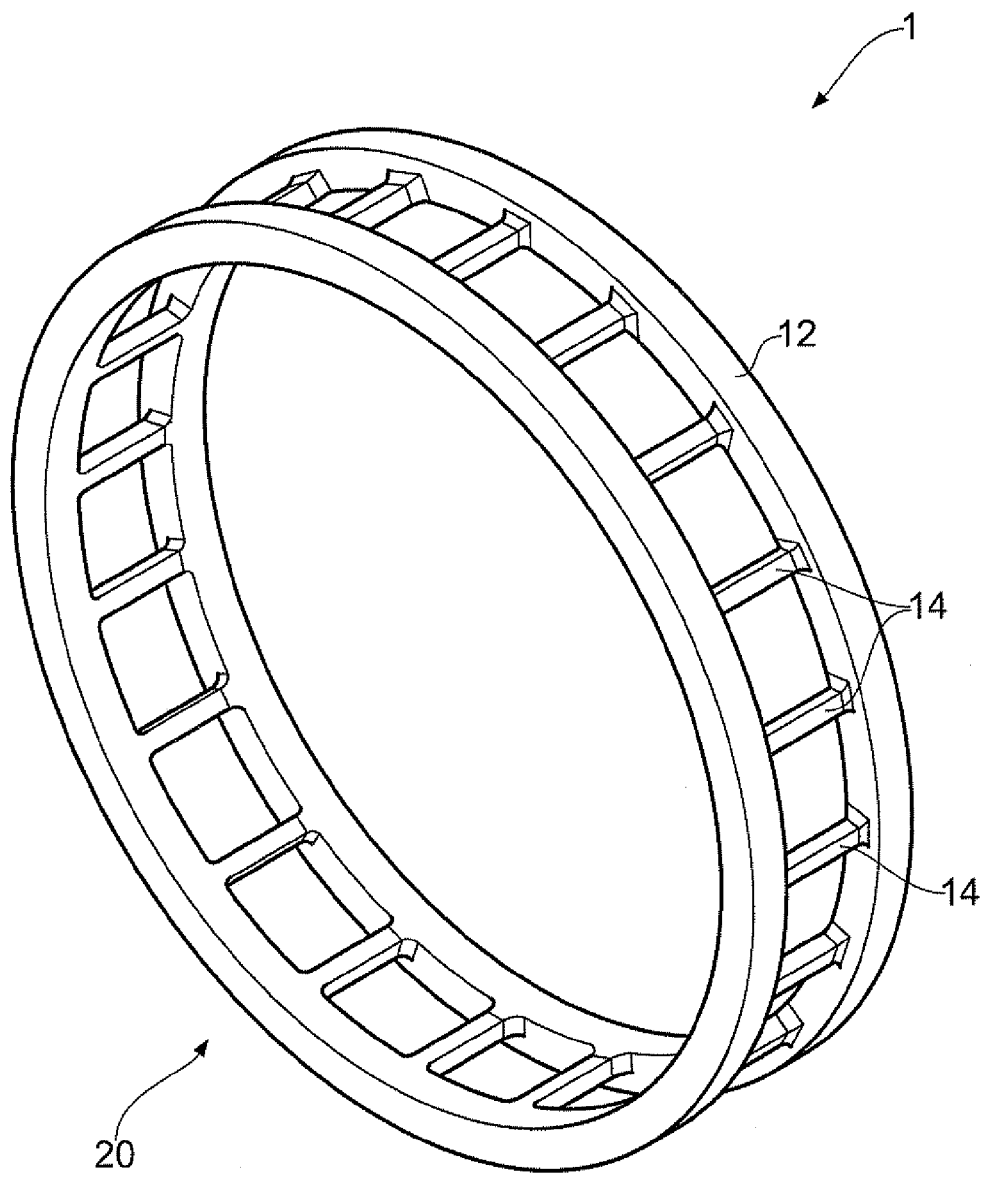
FIG. 2 schematically shows a perspective view of a cage bearing according to the present invention.
Figure 3:
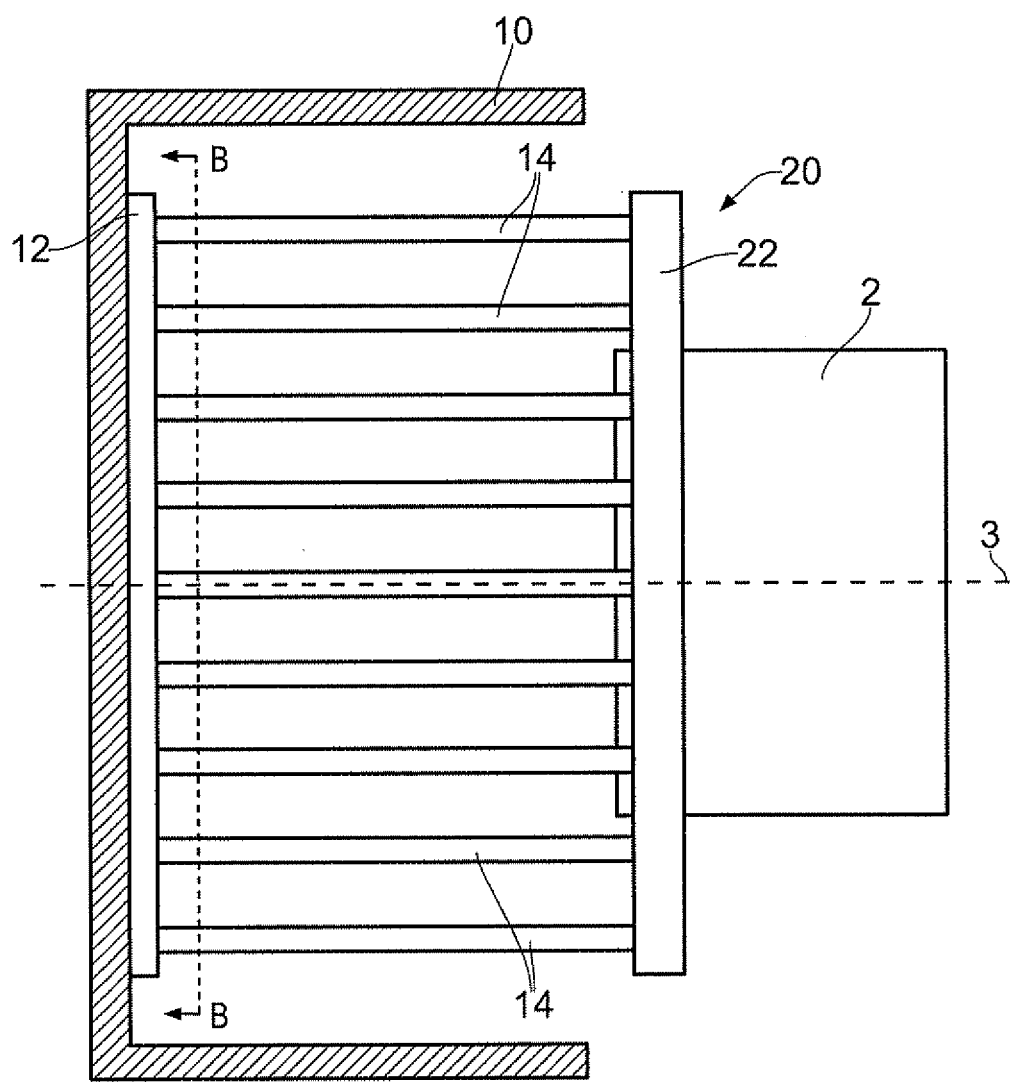
FIG. 3 schematically shows a side view of a cage bearing according to the present invention.

Referring to FIGS. 2 and 3 a bearing assembly 1 for a rotatable shaft 2 according to the present invention comprises a bearing housing 10 having a bearing 20 located within it. The bearing 20 is attached to the bearing housing 10 by an annular flange 12, acting as a mounting portion. The annular flange 12 is connected to the bearing 20 by a plurality of dampers 14 in the form of webs.

Figure 4:
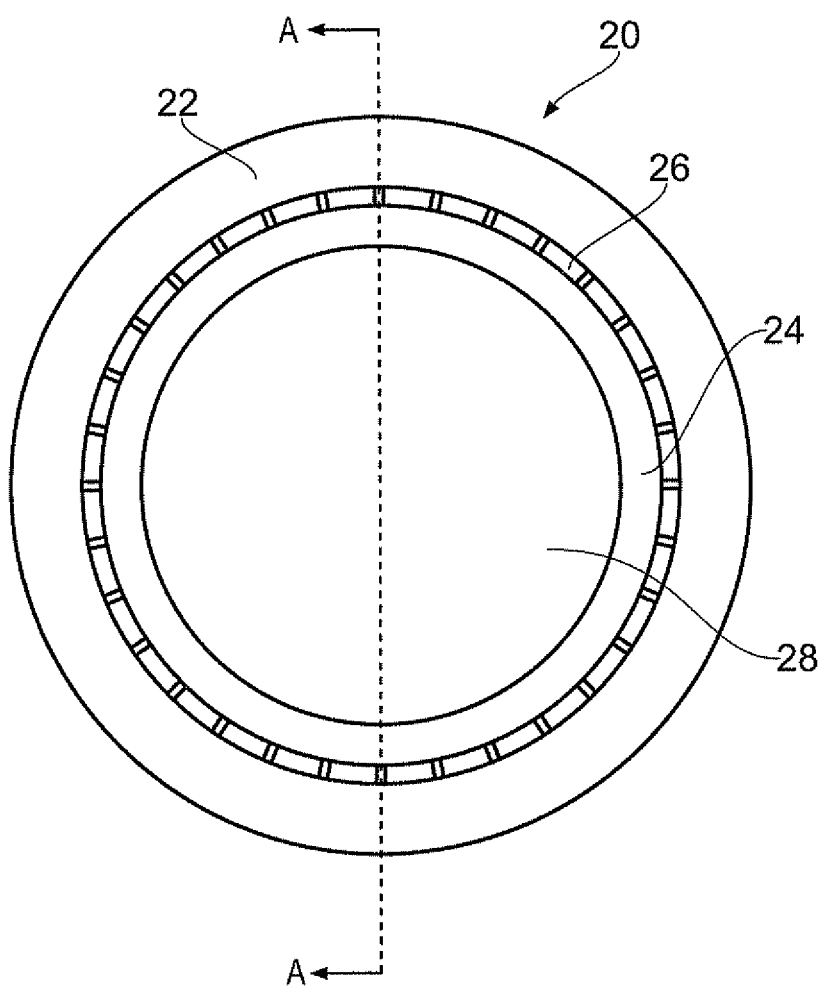
FIG. 4 schematically shows a front view of the bearing of FIGS. 2 and 3.
Figure 5:
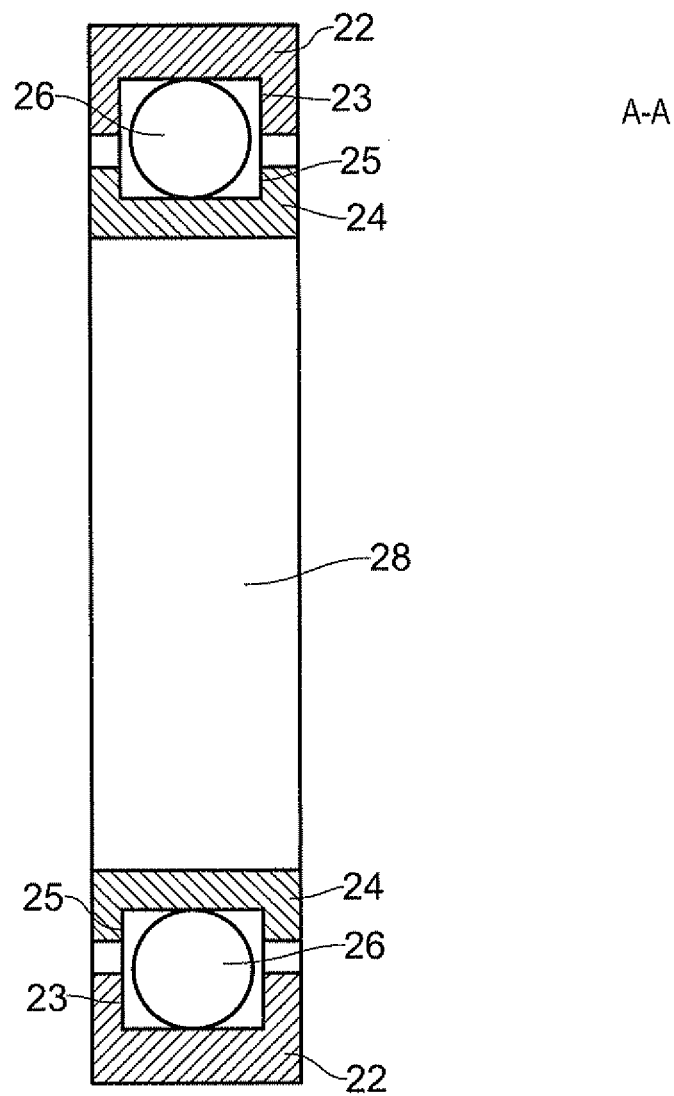
FIG. 5 schematically shows the cross-section A-A of FIG. 4.

FIGS. 4 and 5 show the bearing 20 alone. In this embodiment the bearing 20 is a ball bearing comprising an outer race 22 and an inner race 24. The outer race 22 comprises an annular groove 23 on the inner surface and the inner race 24 comprises an annular groove 25 on the outer surface. A ring of balls 26 is located between the outer race 22 and the inner race 24 and sits within the respective grooves 23, 25. The inner race 24 can therefore rotate with respect to the outer race 22. The inner race 24 comprises an axial opening 28 within which the rotatable shaft 2 can be located. This allows the rotatable shaft 2 to rotate freely with respect to the outer race 22. The webs 14 that attach the flange 14 to the bearing are attached to the outer race 22 and therefore the rotatable shaft 2 can rotate freely with respect to the flange 12. As will be readily apparent to one skilled in the art, other types of bearings such as roller bearings may be used.

Figure 6:
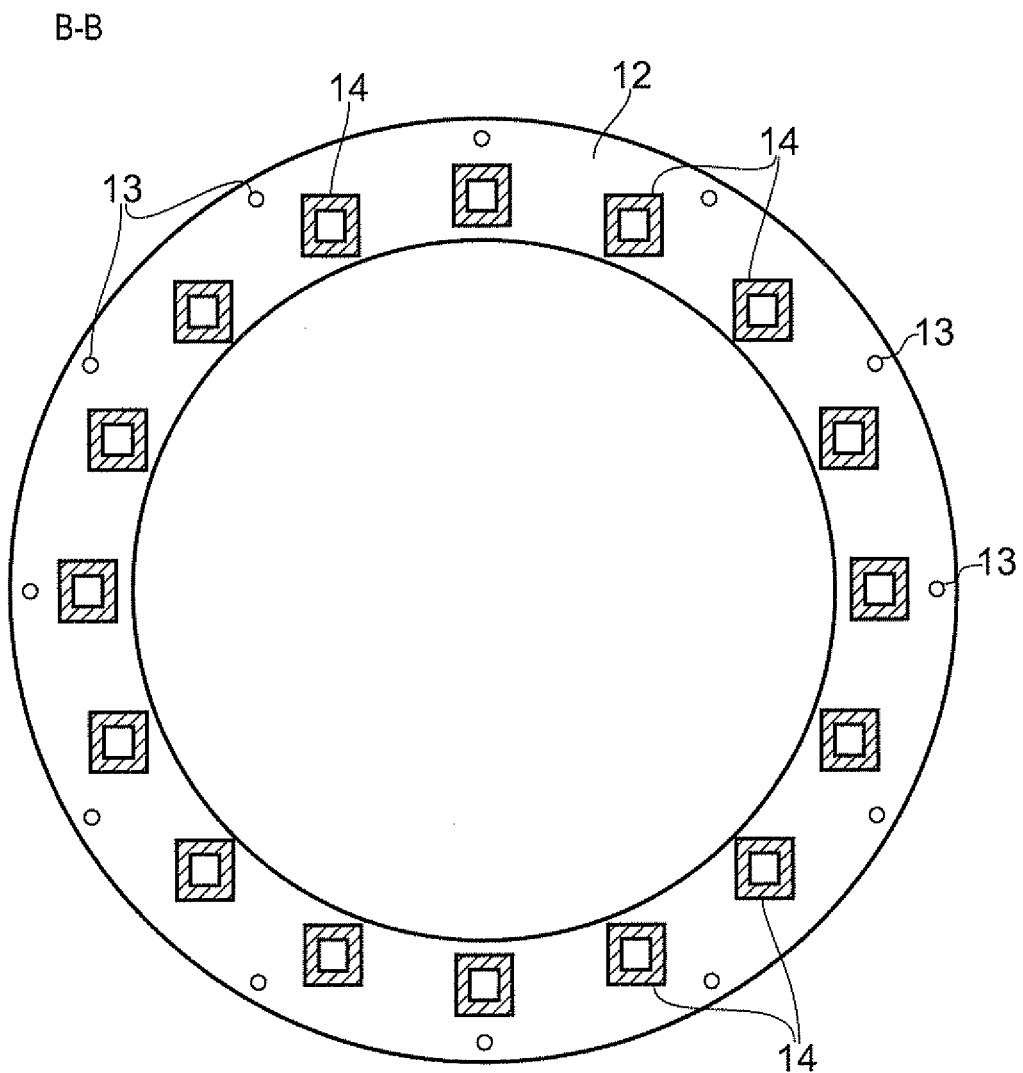
FIG. 6 schematically shows the cross-section B-B of FIG. 3.

As shown in FIG. 6, the flange 12 comprises a plurality of mounting holes 13 for attaching the bearing 20 to the bearing housing 10. The dampers 14 that attach the flange 12 to the bearing 20 are hollow and have a generally square cross-section. Each damper 14 is welded at a first end to the flange 12 and at a second end to the bearing 20. The dampers 14 extend in the axial direction 3 of the rotatable shaft 2 which in use the bearing 20 supports. The dampers 14 are evenly spaced around the circumference of the flange 12 and the outer race 22 and are orientated such that their sides are parallel.

Figure 7A:
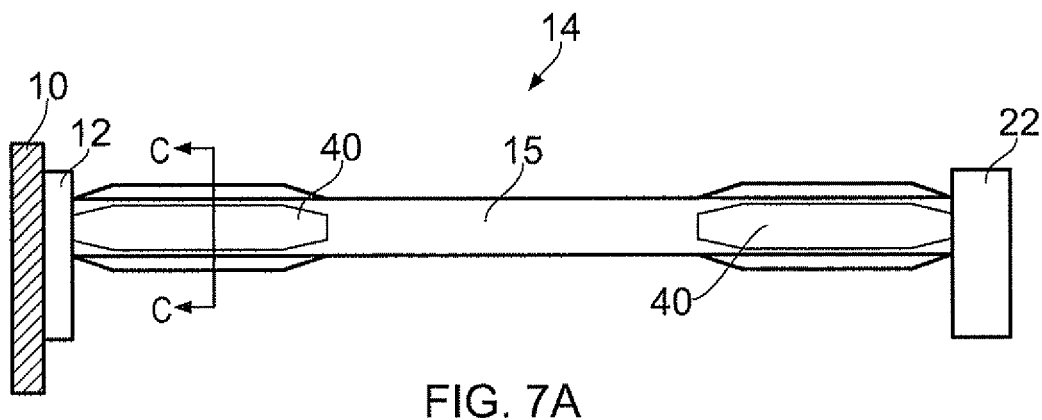
FIGS. 7A and 7B schematically show an enlarged view of an individual damper.

FIG. 7A shows an enlarged view of a damper 14 that connects the flange 12 to the outer race 22 of the bearing 20. Each damper 14 comprises an elongate web 15 and each end of the elongate web 15 comprises a portion of a shape memory alloy 40 (hereinafter referred to as SMA) on the outer surface. The edges of the SMA portions 40 are chamfered in order to avoid stress concentrations at their edges.

Figure 7B:
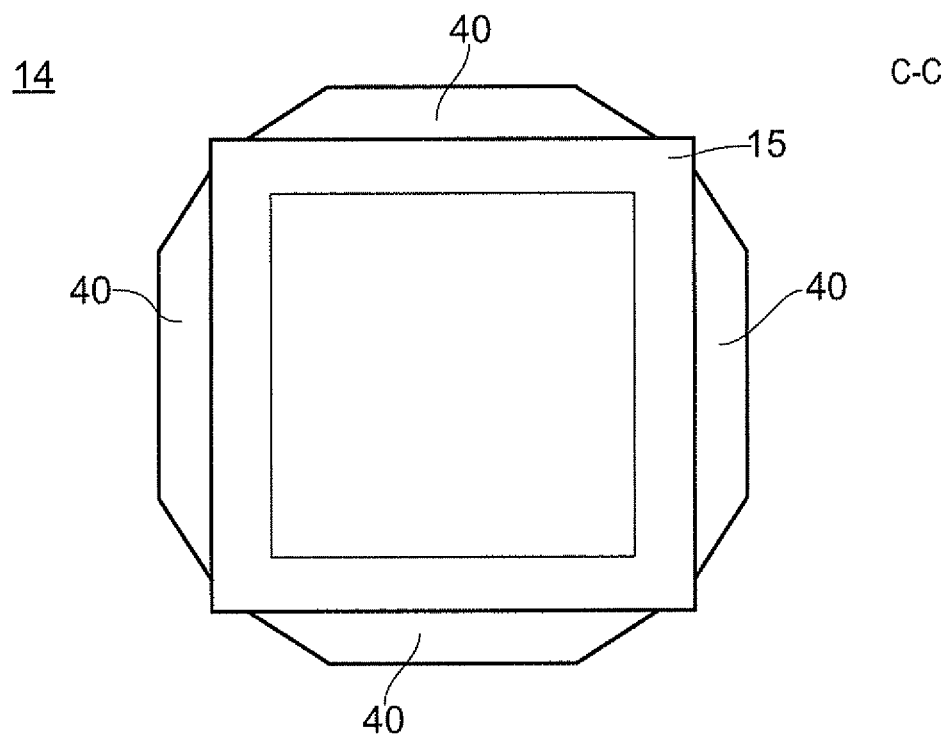

As shown in FIG. 7B, a portion of SMA 40 is bonded to each of the sides of the web 15. The SMA used may be Nitinol, for example. However, other suitable SMAs may be used. In this embodiment, each damper 14 comprises a portion of SMA 40 bonded to each side of each end of the web 15. However, other arrangements may be possible such as manufacturing the webs 15 out of a SMA or applying portions of SMA to alternate webs 15, for example.

A SMA is an alloy that can be easily deformed when cold and then when heated attempts to regain a previously defined shape. This effect is due to a solid-state phase transformation which causes the micro-structure of the SMA to change. The lower temperature phase is commonly known as the martensitic phase and the higher temperature phase is commonly known as the austenitic phase. The martensitic phase of the SMA has a modulus of elasticity that is lower than the austenitic phase.

In the martensitic phase the SMA can be easily deformed and when the SMA is heated, the micro-structure of the SMA changes to the austenitic phase and the SMA returns to a "memory" shape. When the SMA is cooled again, the martensitic phase is once again formed. The temperature-change over which the SMA solid-state phase-change occurs is known as the transition temperature range. This can be as low as 2° C. The phase-change can also be induced by stress.

Figure 8:
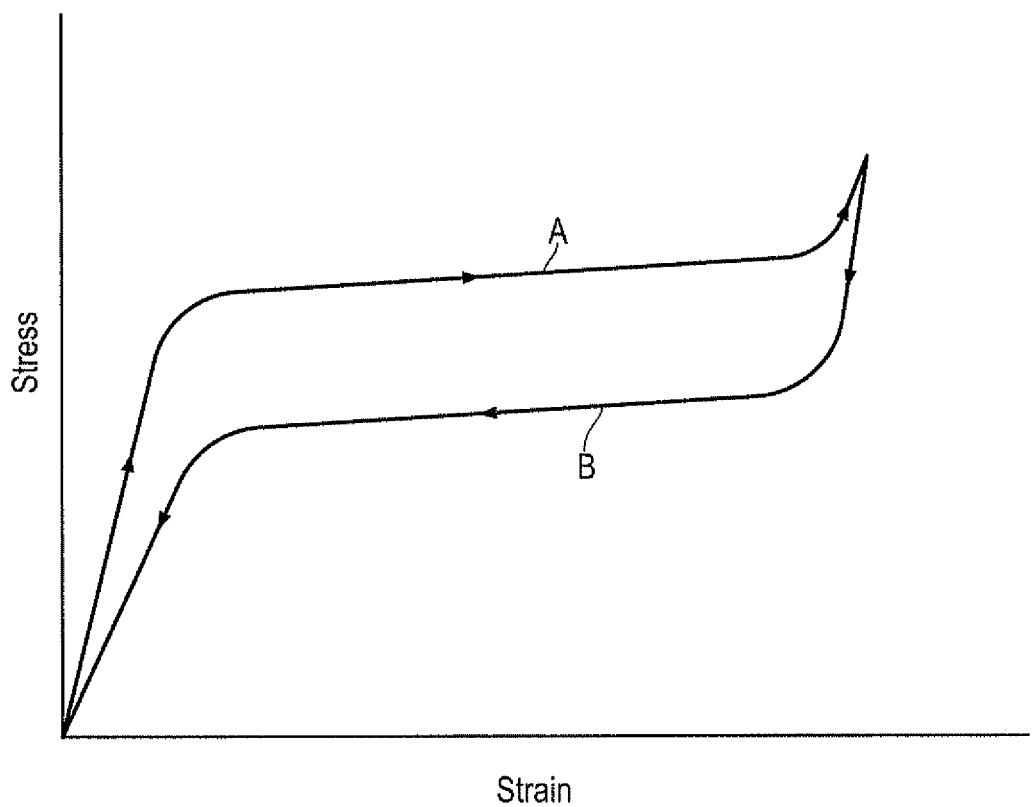
FIG. 8 schematically shows the loading-unloading stress-strain curve for a shape memory alloy at a temperature above the transition temperature.

SMAS can exhibit pseudoelastic (or superelastic) properties. If the SMA is held just above the transition temperature then when stress is applied, the austenitic phase transforms to the martensitic phase. As shown in FIG. 8, since the martensitic phase has a lower elastic modulus, a substantially flat stress-strain curve (A) results with very large strains of up to 18%. When the stress is removed from the SMA then the martensitic phase reverts back to the austenitic phase (B). Although there is a full strain recovery, the loading-unloading cycle is in the form of a hysteresis curve. This hysteresis curve is much larger than for most conventional materials. The area enclosed by the hysteresis loop of the SMA characterises the energy dissipation of the material.

In embodiments of the present invention, the temperature of the portions of SMA 40 that are bonded to the webs 15 of the bearing assembly 1 is controlled.

Figure 9:
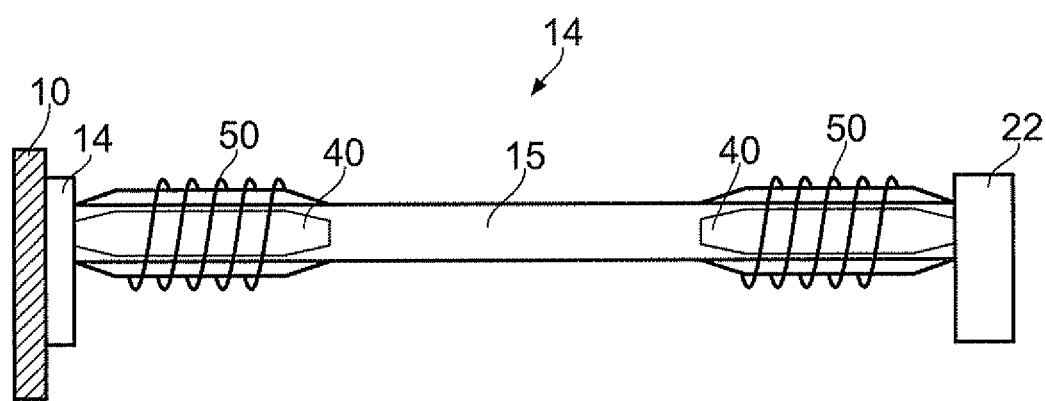
FIG. 9 schematically shows a damper including a means for controlling the temperature.

In this embodiment, the temperature of the portions of SMA 40 that are bonded to the webs 15 is maintained at a temperature that is just above the lower end of their transition temperature range. This may be done by feeding temperature controlled air, or other fluid, towards the SMA 40. As will be readily apparent to one skilled in the art, other means of controlling the temperature may be used such as providing heating elements in the region of the SMA 40 or, as shown in FIG. 9, using heating coils 50 wrapped around the SMA 40. Further, the temperature may not necessarily be specifically controlled. The ambient temperature of the fluid surrounding the SMA portions 40 may be sufficient to maintain the SMA 40 at just above the transition temperature.

Figure 10:
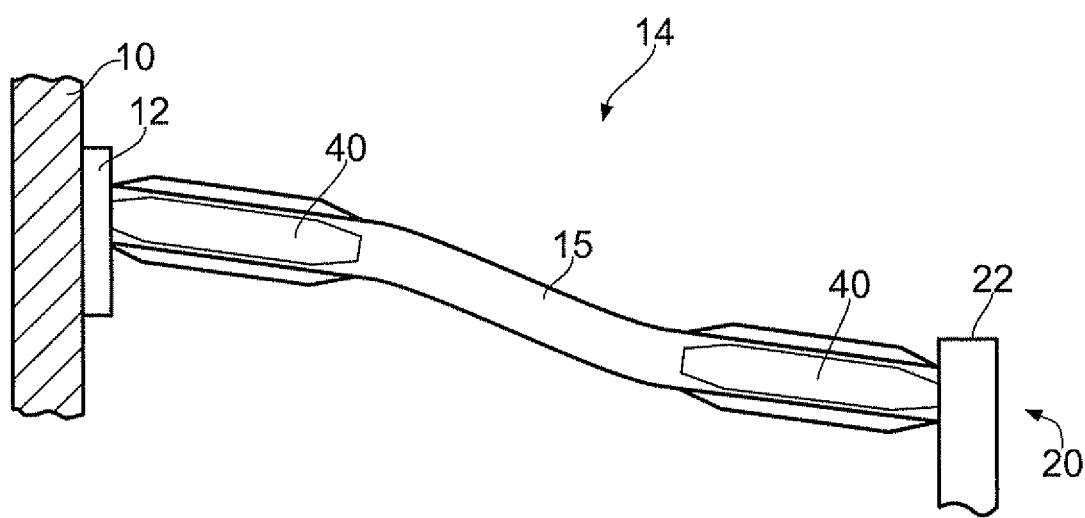
FIG. 10 schematically shows the shape of a deflected damper.

In use, and as shown in FIG. 3, a rotatable shaft 2 is located within the opening 28 of the bearing 20. The vibrations of the rotatable shaft 2 are damped by the bearing assembly 1. When the rotatable shaft 2 vibrates, the dampers 15, comprising the webs 14 and the SMA 40, deflect. FIG. 10 shows an enlarged, exaggerated view of a deflected damper 14. The axial centre of the damper 14 undergoes little, if any bending, and this is why portions of SMA 40 are only applied to the ends of the web 15.

When the dampers 14 are caused to bend due to the vibration of the rotatable shaft, a bending stress is induced in the SMA portions 40. Since the SMA 40 is held at a temperature that is just above the transition temperature, it behaves as a superelastic material, as shown in FIG. 8. This means that the portions of SMA 40 act to dissipate the energy of the vibration. The hysteresis of the loading-unloading cycle of the SMA means that the energy dissipation of the SMA is particularly high when compared to conventional materials. The bearing assembly 1 therefore damps the vibrations of the rotatable shaft and reduces the vibrations transmitted to the rest of the structure.

In a further embodiment, as opposed to holding the SMA 40 at just above the transition temperature so that it behaves as a superelastic material, the temperature of the SMA portions 40 is controlled so that the SMA 40 can be changed from a martensitic phase to an austenitic phase. As described above, the martensitic phase has a modulus of elasticity that is lower than the modulus of elasticity of the austenitic phase. This allows the overall stiffness of the dampers 14 to be altered.

For example, in certain situations, such as when the rotatable shaft 2 is vibrating violently, it may be desirable for the stiffness of the dampers 14 to be low in order to allow other mechanisms (not shown) to steady and lock the bearing position. This can be done by reducing the temperature of the SMA portions 40 to below the transition temperature, thus causing the SMA to be in the martensitic phase. When the vibration of the rotatable shaft 2 has reduced, then it may be desirable to increase the stiffness of the dampers 14. This can be done by increasing the temperature of the SMA portions 14 to above the transition temperature, thus causing the SMA to be in the austenitic phase. If the transition temperature range is narrow, for example 2° C., then the phase change can occur quickly and with ease. The temperature may be controlled by directing air of a suitable temperature into the vicinity of the SMA portions 40, for example.

If the SMA temperature control mechanism fails, then some damping will still be provided.

In alternative embodiments of the invention, the dampers 14 may have a different cross-sectional shape (for example, circular, oval or hexagonal). They may be solid, though hollow webs are likely to provide the most weight efficient solution. The dampers 14 are described as being welded to the flange 12, but may of course be joined by any suitable means.

If there is a natural bias in the forces on the bearings, then this may be compensated for by spacing the dampers unevenly around the circumference of the bearing. Alternatively or additionally, the dampers in different positions may have different properties (for example, diameter, thickness, strength or stiffness) to compensate for this natural bias. This ensures that during running, the offset loads will be evenly damped.

Figure 11:
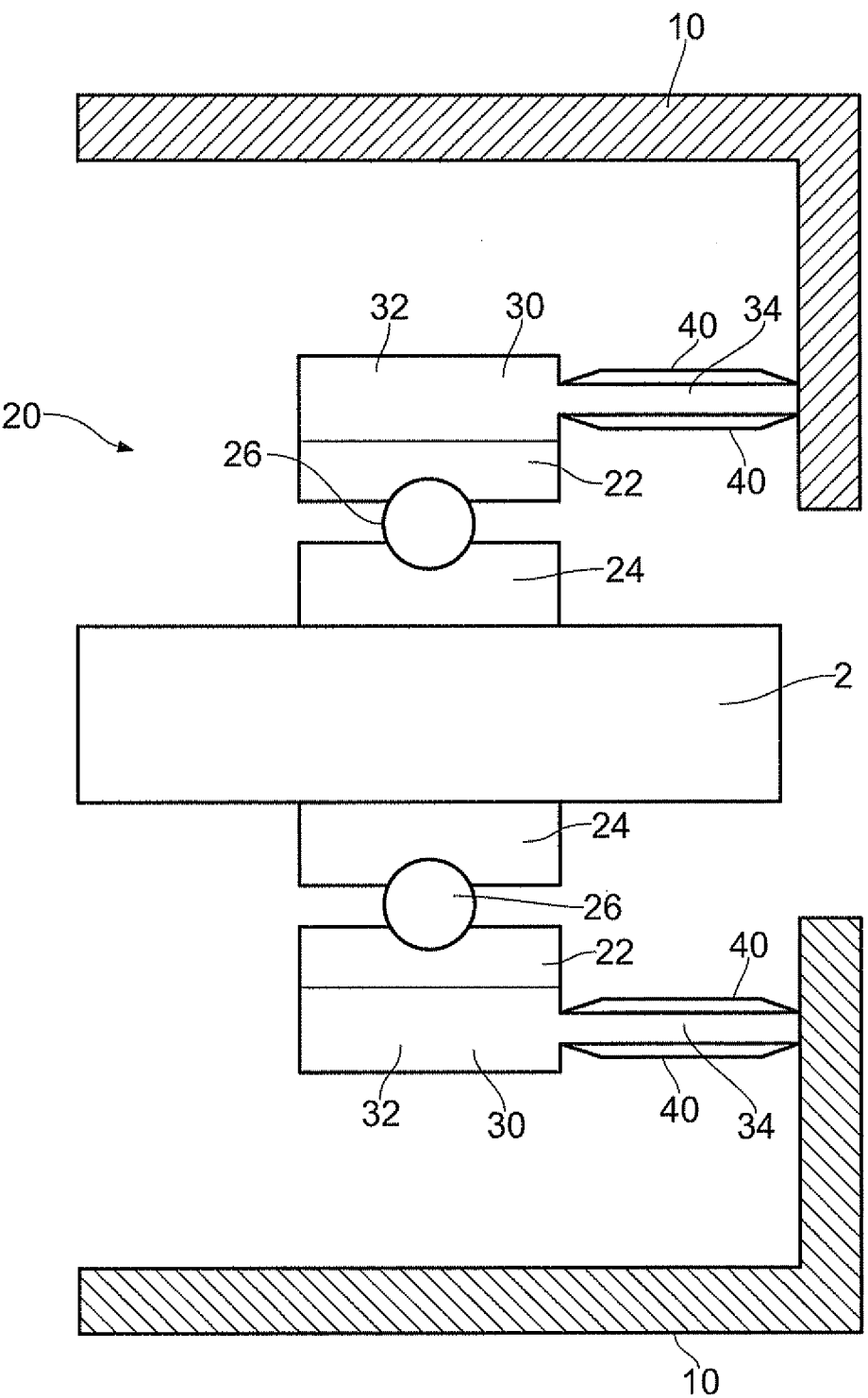
FIG. 11 schematically shows a second embodiment of the present invention.

A second embodiment of the present invention is shown in FIG. 11. In this embodiment the ball bearing 20 is coupled to the bearing housing 10 using a damper assembly 30. The damper assembly 30 comprises a bearing abutment portion 32 and a spring portion 34. The bearing abutment portion 32 is attached to the outer race 22 of the bearing 20 and the spring portion 34 is attached to the bearing housing 10. A portion of SMA 40, such as Nitinol, is bonded to the surface of the spring portion 34. The temperature of the portion of SMA 40 is maintained at a temperature just above the transition temperature of the material. This means that the portion of SMA 40 behaves as a superelastic material, as shown in FIG. 8.

When the rotatable shaft 2 vibrates the spring portion 34 of the spring assembly 30 deflects and this causes a stress to be induced in the portion of SMA 40. Since the portion of SMA 40 acts as a superelastic material it dissipates some of the energy of the vibration and therefore damps the vibration of the rotatable shaft 2. As will be readily apparent to one skilled in the art, the SMA 40 could be changed from the martensitic phase to the austenitic phase in order to change the stiffness of the damper.

The damper assembly 30 may be a continuous annular assembly extending around the entire circumference of the bearing 20, or it may comprise a plurality of discrete dampers spaced around the circumference. In the latter case, the dampers would generally be symmetrically spaced around the bearing 20.

Although the embodiments described herein have referred to a ball bearing, it will be appreciated that the invention is equally applicable to other types of bearing, for example roller bearings or needle bearings.

The invention claimed is:

1. A bearing assembly for a rotatable shaft, comprising:
    a bearing housing;
    a bearing located within the bearing housing and arranged in use to receive the rotatable shaft;
    at least one vibration damper that couples the bearing to the bearing housing for damping vibrations of the rotatable shaft;
    a shape memory alloy formed on surfaces of the at least one vibration damper; and
    a temperature controller that maintains the temperature of the shape memory alloy of the at least one vibration damper during intended operating conditions to be above a transition temperature such that the shape memory alloy behaves as a superelastic material, wherein the transition temperature is defined between a martensitic-phase temperature and an austenitic-phase temperature.

2. A bearing assembly according to claim 1, wherein the at least one vibration damper comprises an elongate member having a portion of the shape memory alloy attached thereto.

3. A bearing assembly according to claim 2, wherein the shape memory alloy is attached to the elongate member at a first end and a second opposing end.

4. A bearing assembly according to claim 1, further comprising a mounting portion that couples the at least one vibration damper to the bearing housing.

5. A bearing assembly according to claim 1, wherein the bearing is a ball bearing or a roller bearing or a needle bearing.

6. A bearing assembly according to claim 1, wherein the at least one vibration damper comprises a plurality of vibration dampers there are a plurality of vibration dampers that each extend at least partially in an axial direction of the rotatable shaft which the bearing is arranged to receive.

7. A bearing assembly according to claim 6, wherein each of the vibration dampers has a generally square cross section and the sides of the vibration dampers are parallel to one another.

8. A bearing assembly according to claim 6, wherein the plurality of vibration dampers are circumferentially arranged around an axis of the rotatable shaft which the bearing is arranged to receive.

9. A gas turbine engine comprising a bearing assembly according to claim 1.

10. A method of controlling the stiffness of a vibration damper of a bearing assembly, the bearing assembly comprising: a bearing housing; a bearing located within the bearing housing and arranged in use to receive a rotatable shaft; a shape memory alloy on the vibration damper, wherein the vibration damper couples the bearing to the bearing housing for damping vibrations of the rotatable shaft; the method comprising:
    controlling the temperature of the shape memory alloy, so as to maintain the temperature of the shape memory alloy during intended operating conditions to be above a transition temperature such that the shape memory alloy behaves as a superelastic material, wherein the transition temperature is defined between a martensitic-phase temperature and an austenitic-phase temperature.

* * * * *